United States Patent [19]

Hester

[11] Patent Number: 4,516,013

[45] Date of Patent: May 7, 1985

[54] DECOYING CALCULATOR

[76] Inventor: Robert W. Hester, Rte. 1, Box 1B, Fairfield, N.C. 27826

[21] Appl. No.: 505,901

[22] Filed: Jun. 20, 1983

[51] Int. Cl.³ .............................................. G06C 27/00
[52] U.S. Cl. .................................. 235/78 R; 235/88 R; 235/70 A
[58] Field of Search ................ 235/78 R, 70 R, 70 A, 235/74, 78 G, 78 N, 78 M, 83, 84, 88 R, 88 N, 88 F, 88 M

[56] References Cited

U.S. PATENT DOCUMENTS

| 3,698,630 | 10/1972 | Dick et al. | 235/78 R |
| 4,134,006 | 1/1979 | Gordon | 235/78 N X |
| 4,329,570 | 5/1982 | Koll | 235/88 R X |

Primary Examiner—L. T. Hix
Assistant Examiner—Brian W. Brown
Attorney, Agent, or Firm—Mills & Coats

[57] ABSTRACT

This invention is a calculator that is particularly adapted to assist the user thereof in determining the location of waterfowl decoys relative to a duck blind. The calculator can be adjusted as wind direction dictates to give varying patterns under varying wind speeds and directions.

8 Claims, 7 Drawing Figures

DECOYING CALCULATOR

FIELD OF INVENTION

This invention relates to calculators and more particularly to calculators particularly designed to aid in the sitting of waterfowl decoys.

BACKGROUND OF INVENTION

In the hunting of waterfowl, whether it be geese, swans, ducks or the like, decoys are often used to attract flying birds within shooting range of a blind or other location of the hunter. At one time, tethered line birds were used and their natural movement was excellent for the purpose since the birds could move about some distance on their tethers. The use of live decoys has since been outlawed thus making the only decoys available are the artifical decoys. These can be made of wood, plastic, hard rubber or the like and can be painted to represent not only different species but old birds, young birds, and family groupings.

Birds in the process of landing, whether on water or in a field, will not land immediately over the birds already on the water ground. The apparent reason for this is that the landing birds realize that if the birds on the ground should flush, serious problems could ensue.

In addition to the above, it is known that all birds land up for obvious reasons. Some of the smaller species are able to turn at the last minute into the wind before landing while larger species require some distance of gliding before sitting down. In any case the landing patterns of the waterfowl must be taken into consideration in the setting of the decoys.

Although experienced waterfowlers are familiar with the above-discussed information, it is still difficult to arrange decoys for the maximum effect under various conditions and it is particularly difficult when such conditions are varying such as wind shifts and increase or decrease in velocity. When experienced waterfowlers have difficulty in properly setting decoys, for the novice or person who only occasionally hunts waterfowl it is almost impossible to obtain satisfactory results, particularly in areas where the birds have been shot over and are "educated".

BRIEF DESCRIPTION OF INVENTION

After much research and study into the above-mentioned problems, the present invention has been developed to provide a means for accurately determining the location of decoy sets under prevailing wind directions and velocities. This is accomplished through the use of a rotatable transparent calculator which indicates not only the locations of the decoys within the safe zone but also the locations of the primary species and secondary species. In addition, the calculator indicates to the setter of the decoys the location of the pocket or pockets relative to the blind as well as the flank points of the set. The calculator is designed for both single and double pocket decoying and indicates to the user thereof when each is appropriate.

In view of the above, it is an object of the present invention to provide a device for indicating the proper set of decoys under prevailing wind directions and velocities.

Another object of the present invention is to provide a means for determining when single pocket and double pocket decoying should be used.

Another object of the present invention is to provide an aid in determining the proper location of decoys even under low light and other adverse conditions.

Another object of the present invention is to provide a means for checking a decoy set to assure that the same is proper for maximum attracting of the species of waterfowl desired.

Another object of the present invention is to provide a readily manipulatable calculator for determining proper set of waterfowl decoys.

Other objects and advantages of the present invention will become apparent and obvious from a study of the following description and the accompanying drawings which are merely illustrative of such invention.

DETAILED DESCRIPTION OF THE INVENTION

Figure 1:
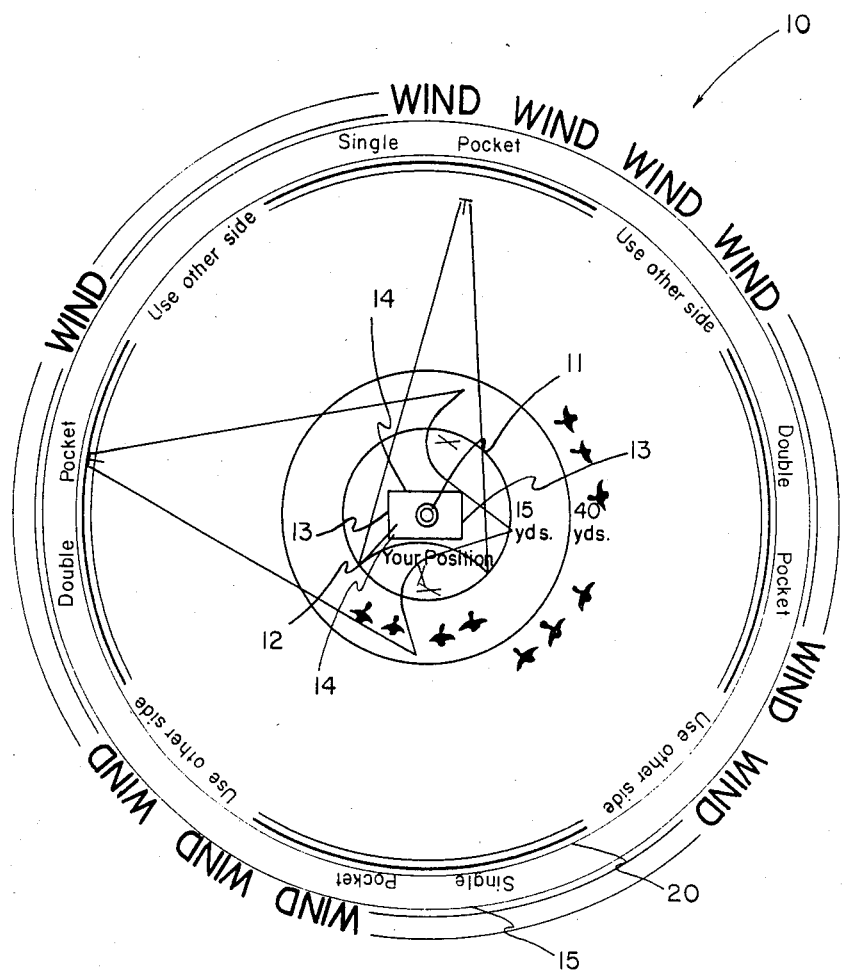
FIG. 1 is a view of Side I of the decoying calculator of the present invention showing both the single pocket and double pocket discs.

Over the years decoys have evolved to suit given sets of circumstances in given areas. Decoy numbers, styles and arrangements depend on the type game sought in the local area. The basic guidelines of decoying are herein set out but the specifics for any given species will not be given due to the wide variance therein. A good source reference for this information is a publication entitled "The Secrets of Decoying Ducks and Geese" which was published in 1982 by Bob Hester who is a professional hunting guide.

Individual decoys must be placed so that each has a purpose and contributes to the total effect. Certain decoys are used to attract certain waterfowl but more specifically, they should be used to attract waterfowl to a given spot for a productive shoot.

There are two specific reasons for using decoys. First, they must be so arranged to bring the live birds within shooting range and secondly, they should bring the birds within the angle of fire most advantageous to all shooters. Although ranges vary with individuals as well as types and loads of shells, the effective range should be the maximum effective range of the poorest shooter. This must be, of course, determined on an individual basis.

The optimum shooting angle is the direction from the blind most advantageous to all gunners in the blind. Certain angles give only one or two shooters an opportunity to fire whereas other angles give all shooters an opportunity. Even with only two shooters, if the waterfowl comes on one side or the other, then only one has an opportunity to shoot whereas if the waterfowl comes either from in front or from behind, then both shooters have an equal opportunity to fire. This is referred to as the optimum shooting direction angle.

There are two truths known about waterfowl; first, they invariably land upwind or into the wind. This slows their forward momentum and produces a slower, more comfortable landing. Because of agility factors, small waterfowl are able to turn against the wind in the last few yards before touchdown while larger birds demand a greater glide distance in making their landing approach. In either case, however, they invariably touch down against the wind. Secondly, waterfowl avoid flying low over birds sitting on the ground or in the water. This restraint exists because of the danger of collisions should the grounded birds be flushed. Thus, ducks, geese and other waterfowl invariably will land in an open area among the sitting birds. This pocketing effect is used to advantage by the present invention.

Referring more specifically to the decoying calculator of the present invention, indicated generally at 10, a circular face is shown with a rotation point 11 in the center thereof. An elongated block 12 representing two or more shooters in a blind has ends 13 from which only part of the shooters can safely fire and sides 14 from which all shooters can safely fire. In use, the calculator 10 is always oriented with the block 12 facing in the same direction as the disposition of the actual hunters within the blind, i.e., sides 14 of block 12 face the optimum shooting direction for the hunters in the blind (not shown).

Figure 5:
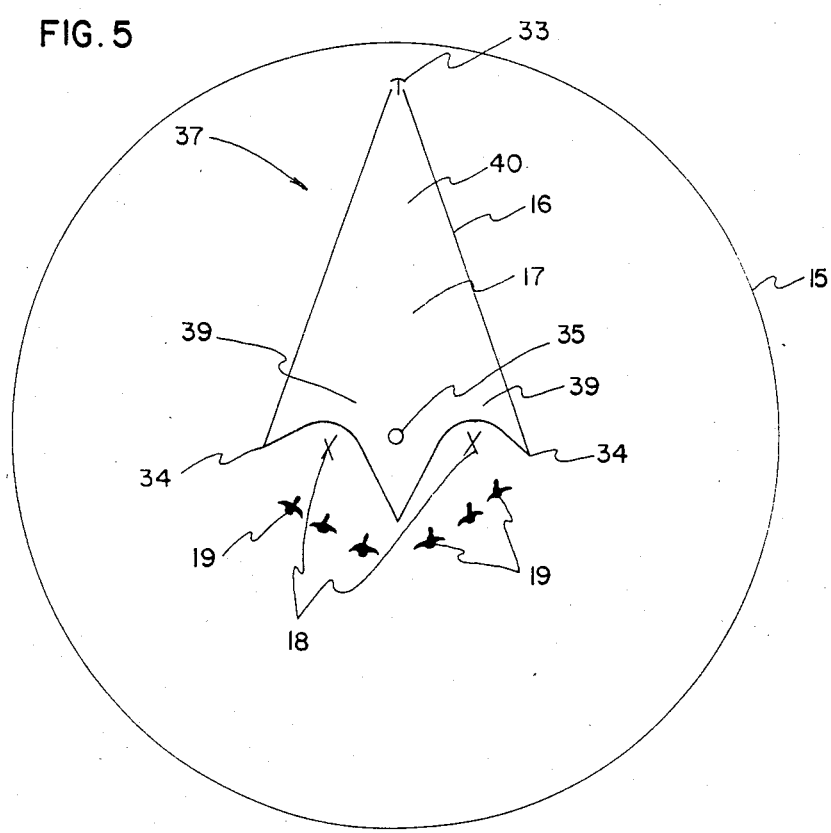
FIG. 5 shows the indicia on the double pocket disc.

The bottom or larger disc 15 on Side I shown in FIG. 1 and separately in FIG. 5 is for a double pocket decoy set. The indicia marking boundary 16 encloses a safe zone 17 within which to deploy decoys. The configuration of this boundary forms two pockets 18 into which the waterfowl will be attracted. Indicia 19 indicates the direction from which the waterfowl will approach pockets 18.

Figure 4:
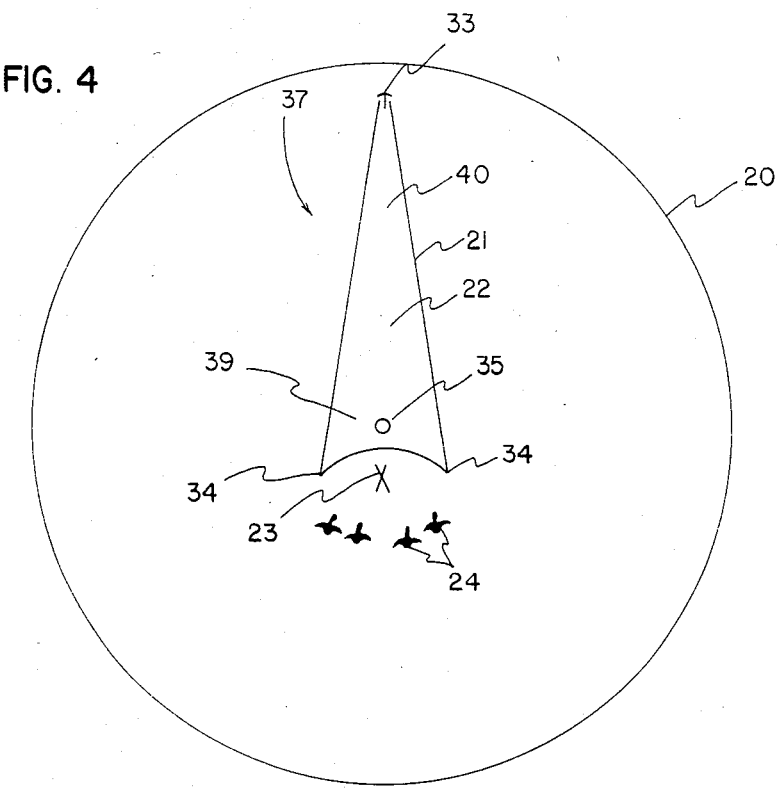
FIG. 4 shows the indicia on the single pocket disc.

The smaller or top disc 20 as shown in FIG. 1 and separate in FIG. 4 is for a single pocket decoy set and has indicia forming boundary 21 which encloses safe zone 22 and forms single pocket 23. The direction of landing of the waterfowl is indicated at 24.

Figure 2:
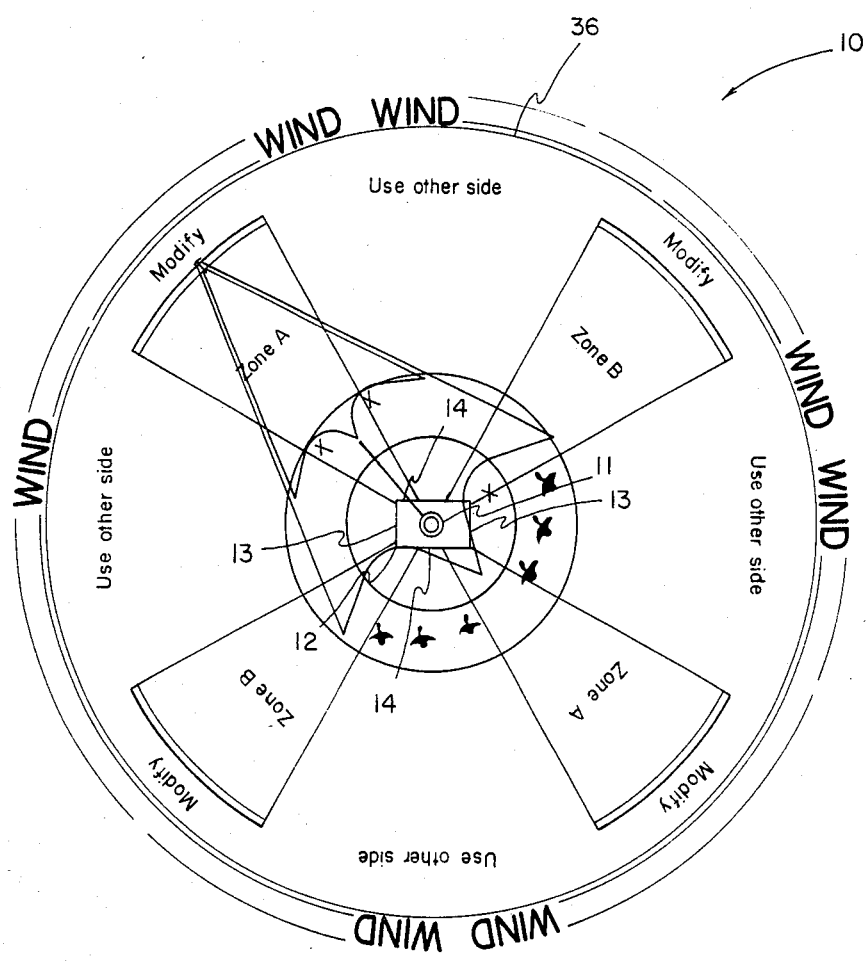
FIG. 2 is a view of Side II the decoying calculator of the present invention showing the modified pocket disc in one position.
Figure 3:
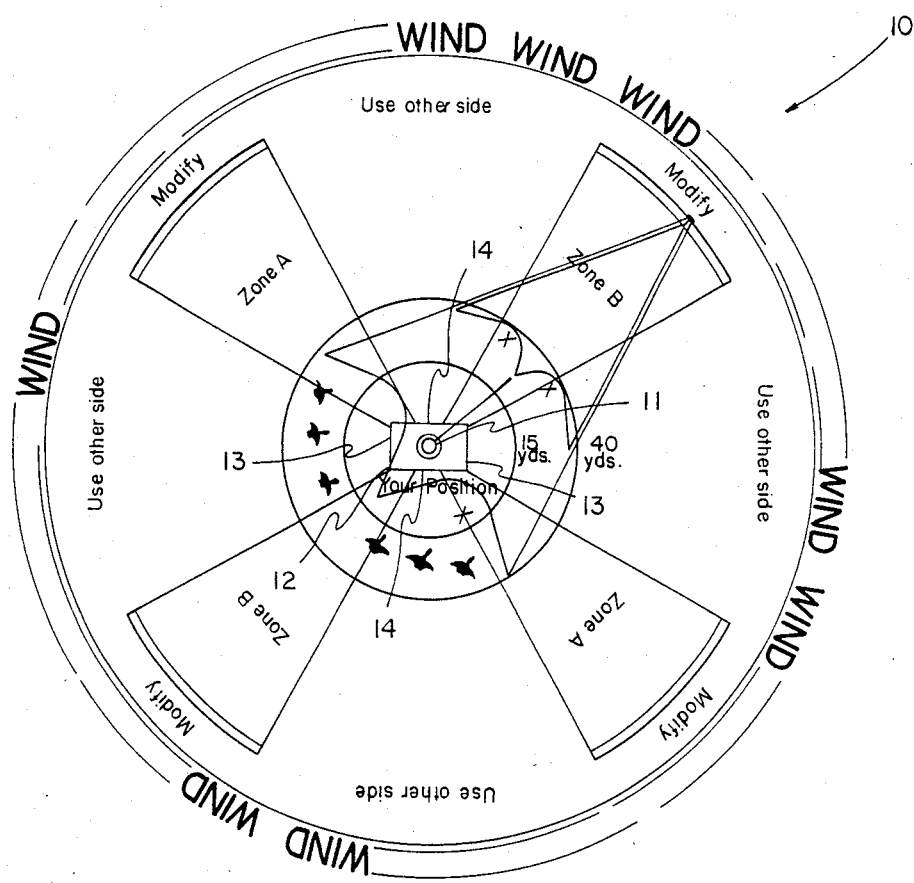
FIG. 3 is a view of Side II of the decoying calculator of the present invention showing the modified pocket disc in another position.

Although two separate discs can be included on Side II shown in FIGS. 2 and 3, it has been found more convenient to show two separate decoy deployment patterns on the same disc, one for instance being printed in green and the other being printed in blue. For clarity of configuration, the green deployment pattern is shown separately in FIG. 6 and the blue deployment pattern is shown separately in FIG. 7.

Figure 6:
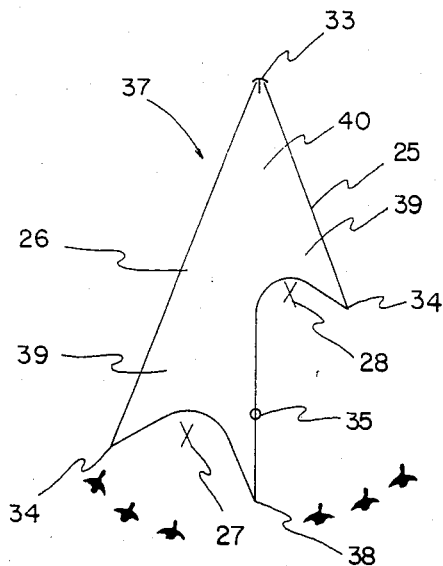
FIG. 6 shows the zone A modified pocket indicia on the Side II disc.
Figure 7:
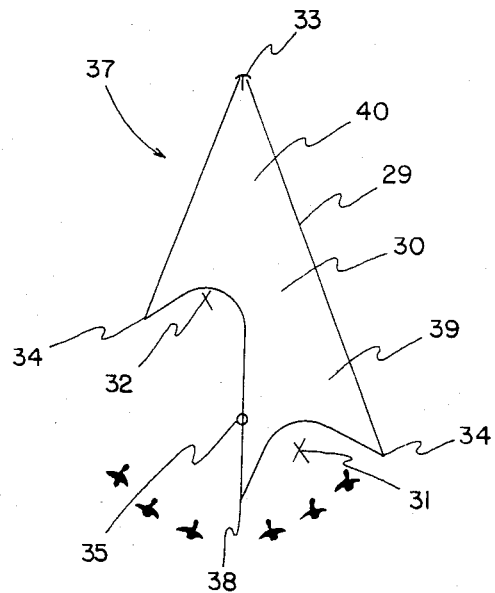
FIG. 7 shows the zone B modified pocket indicia on the Side II disc.

Referring specifically to the modified double pocket of FIG. 6 used in conjunction with Zone A of Side II, a boundary 25 is shown enclosing the safe zone 26 with a downwind pocket 27 and an upwind pocket 28. The decoy deployment pattern for Zone B of Side II of the calculator of the present invention is shown in FIG. 7 and includes a boundary 29, a safe zone 30, a downwind pocket 31 and an upwind pocket 32.

Referring further to the various decoy deployment patterns shown in FIG. 4 through 7, each includes a tip or anchor spot 33 which is manipulated to point into the wind. Each of these patterns also includes flank points 34 and is rotated at 35.

From a close inspection of FIGS. 1 through 3, it can be seen that each of the various configured decoy deployment patterns are pointing in directions indicated correct for setting decoys. It is also important to note that in each instance the pocket or pockets of the deployment pattern is disposed off one side or the other of side 14 of block 12 and in no instant is a pocket disposed off the undesirable ends 13 of such block.

The two discs 15 and 20 on Side I illustrated in Fig. 1 and disc 36 on Side II illustrated in FIGS. 2 and 3 are all rotatively mounted with points 11 and 35 serving as the axis of rotation.

On Side I of the calculator 10 of the present invention, there are "Single Pocket" and "Double Pocket" Zones and also Zones which indicate "Use Other Side". On Side II of the calculator the areas corresponding to "Use Other Side" on Side I are indicated as either "Zone A" or "Zone B". Also on such second side the areas indicated "Use Other Side" correspond to the "Single Pocket" and "Double Pocket" portions of the first side. Thus it can be seen that all points of the compass rose are covered by an acceptable decoy deployment pattern.

To use the decoying calculator 10 of the present invention, block 12 is aligned with the blind being used as described above. Holding the calculator horizontally, the various discs are rotated until their tips or anchor spots 33 are pointing into the wind. If the anchor spots on Side I point towards "Use Other Side", then the calculator is turned over. If the anchor spots point to "Single Pocket", then the single pocket deployment pattern shown in FIG. 4 is used. If the anchor spot points towards "Double Pocket", then the double pocket deployment pattern shown in FIG. 5 is used. If Side II is used, then the same process is followed in determining whether to use the Zone A pattern shown in FIG. 6 or the Zone B pattern used in FIG. 7.

Once the appropriate decoy deployment pattern has been determined, the decoys themselves are placed relative to the blind in the following order: a decoy is placed at the location indicated at anchor spot 33 and one at each of the flank points 34. In the case of the double pocket patterns, a decoy would also be placed at center pull point 38. Once these initial decoys have been put out, they serve as reference points for the deployment of the remaining decoys.

The pocket formation decoys are next deployed and are of the primary specie type of waterfowl to be attracted. The area of this primary specie is indicated at 39 on the various decoy deployment patterns 37 shown in the drawings. Finally the secondary or attractor specie decoys are deployed in the area of the safe zones indicated at 40.

The attractor or secondary specie decoys are the long range pulling force of the decoy set, the primary specie are the decision maker decoys that the waterfowl "lock in on" with their final approach. These decoys should be the most realistic in the decoy set. Finally the center pulled decoys behind center pull point 38 in the double pocket deployment patterns, while being of the primary specie type and part of the decision making group, serve primarily to force the birds being decoyed to land center way of the pockets and not leary of the blind.

Although the various deployment patterns 37 are shown with the blinds being surrounded by the safe zone set area, to eliminate "fronting" where wary birds approaching the decoy set flare and land upwind enough to be out of range of the blind, the decoy sets according to the deployment patterns hereinabove described can be placed 30 or so yards upwind of the blind so that the wary waterfowl can be taken before they realize that the decoys are fakes. This is particularly useful procedure when hunting Canadian geese.

Although various safe zones have been described, it is not necessary to fill such zones with decoys. These zones only indicate the areas where decoys can safely be set for any given blind orientation and wind direction.

The distances between the blind and the anchor spot will vary according to wind velocity. It has been found through experience that with a wind velocity of five miles per hour, forty to sixty yards is appropriate; at ten miles per hour, a distance of sixty to eighty yards is suitable; in a fifteen mile per hour wind, eighty to hundred yards is appropriate; and at twenty miles per hour and greater, one hundred yards or more. In this latter instance, it is often deemed appropriate to move the entire decoy set upwind.

From the above it can be seen that by using the calculator of the present invention and appropriately manipulating the same relative to blind orientation and wind direction, proper pocket formation as well as primary and secondary specie decoy deployment can be accomplished. The present invention also has the advantage of providing a relatively inexpensive and yet highly efficient decoying calculator which is usable under varying wind directions and conditions.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

I claim:

1. A means for illustrating a preferred decoy set comprising: a base; indicia in the central portion of said base for alignment with a physical location; a generally transparent disc rotatively mounted on said base with the center thereof disposed centrally of said base indicia; a point on said disc outwardly of its center to be disposed in the direction of ambient wind; and at least one indicia on said disc illustrating a preferred decoy deployment pattern whereby, relative to said physical location, proper placement of decoys can be determined relative to ambient wind direction.

2. The means of claim 1 wherein at least one additional disc is rotatively superimposed above said first mentioned disc and includes at least one indicia illustrating a different decoy deployment pattern from that on said first mentioned disc whereby under varying wind directions, alternate patterns can be selected.

3. The means of claim 2 wherein additional indicia on said base indicates which disc decoy deployment pattern is preferable under various ambient wind directions.

4. The means of claim 2 wherein the indicia on said first disc and the indicia on said second disc are coordinated with an additional indicia on said base.

5. The means of claim 2 wherein an additional disc is provided on the reverse side of said base from said first two mentioned discs.

6. The means of claim 1 wherein at least two indicia are provided on said disc illustrating at least two different decoy deployment patterns to be used alternately under different ambient wind directions.

7. The means of claim 4 wherein said additional indicia included on said base indicates which of the decoy placement patterns is preferable under any given ambient wind direction.

8. The means of claim 1 wherein at least one additional disc is rotatively mounted on the side of said base opposite said first mentioned disc; and at least one indicia on said second disc illutrates an alternate decoy deployment pattern.

* * * * *